(12) United States Patent
Kinno et al.

(10) Patent No.: US 7,547,146 B2
(45) Date of Patent: Jun. 16, 2009

(54) ROLLING BEARING SEAL OR SHIELD MEMBER

(75) Inventors: Dai Kinno, Kanagawa (JP); Hiroyuki Ito, Kanagawa (JP); Toshikazu Yabe, Kanagawa (JP); Shingo Higashi, Kanagawa (JP)

(73) Assignee: NSK Ltd., Tokyo (JP)

( * ) Notice: Subject to any disclaimer, the term of this patent is extended or adjusted under 35 U.S.C. 154(b) by 629 days.

(21) Appl. No.: 10/505,771

(22) PCT Filed: Feb. 27, 2003

(86) PCT No.: PCT/JP03/02247

§ 371 (c)(1), (2), (4) Date: Aug. 26, 2004

(87) PCT Pub. No.: WO03/072984

PCT Pub. Date: Sep. 4, 2003

(65) Prior Publication Data

US 2005/0117826 A1 Jun. 2, 2005

(30) Foreign Application Priority Data

Feb. 27, 2002 (JP) ............... 2002-051575
Jul. 25, 2002 (JP) ............... 2002-216833
Nov. 26, 2002 (JP) ............... 2002-342280

(51) Int. Cl.
*F16C 33/76* (2006.01)

(52) U.S. Cl. .................. 384/477; 277/456

(58) Field of Classification Search .......... 384/462, 384/463, 477, 482
See application file for complete search history.

(56) References Cited

U.S. PATENT DOCUMENTS

| 4,450,209 A | 5/1984 | Hara et al. | |
| 4,659,631 A * | 4/1987 | Kurimoto et al. | 428/624 |
| 6,003,876 A * | 12/1999 | Yamagishi et al. | 277/407 |
| 6,500,544 B1 * | 12/2002 | Tiitu et al. | 428/413 |
| 2003/0170485 A1* | 9/2003 | Carey et al. | 428/647 |

FOREIGN PATENT DOCUMENTS

JP       58-098248 A       6/1983

(Continued)

OTHER PUBLICATIONS

Chinese Office Action dated Jan. 26, 2007.

*Primary Examiner*—Richard W L Ridley
*Assistant Examiner*—James Pilkington
(74) *Attorney, Agent, or Firm*—Sughrue Mion, PLLC

(57) ABSTRACT

The present invention is to offer such a rolling bearing excellent in the corrosion resistance and suited to the environmental protection. This rolling bearing rotatably holds, via a retainer, a plurality of rolling elements between an inner ring having an inner ring raceway in an outer circumference and an outer ring having an outer ring raceway in an inner circumference, and is sealed with a seal or a shield member covered with a rubber, wherein a core metal of the seal or the shield member is a steel sheet that is covered with a film of 0.2 to 50 μm thickness, the film comprising a metal or an alloy having a smaller oxidation-reduction potential than that of iron, and that is formed with a film comprising an inorganic substance of lithium and silica as an uppermost layer.

1 Claim, 6 Drawing Sheets

FOREIGN PATENT DOCUMENTS

| | | |
|---|---|---|
| JP | 5-65670 A | 3/1993 |
| JP | 6-50343 A | 2/1994 |
| JP | 09-041168 A | 2/1997 |
| JP | 09-088980 A | 3/1997 |
| JP | 10-15487 A | 1/1998 |
| JP | 11-62989 A | 3/1999 |
| JP | 2000-45078 A | 2/2000 |
| JP | 2000-265111 A | 9/2000 |
| JP | 2001-27253 A | 1/2001 |
| JP | 2001-131712 A | 5/2001 |
| JP | 2001-215133 A | 8/2001 |
| JP | 2001-323942 A | 11/2001 |
| JP | 2004-138110 A | 5/2004 |

* cited by examiner

MEASURED VALUES OF Si CONTENT WEIGHT% (10kV)

MEASURED VALUES OF Si CONTENT WEIGHT% (10kV)

ROLLING BEARING SEAL OR SHIELD MEMBER

TECHNICAL FIELD OF THE INVENTION

The present invention relates to a rolling bearing, in particular to a technique for improving corrosion resistance.

BACKGROUND OF THE INVENTION

The rolling bearing is provided with a seal or a shield member (also called as "seal material" hereafter) on a bearing ring for avoiding leakage of a sealed grease, a lubricant or invasion of foreign materials from an outside. For example, a ball bearing shown with a cross section in FIG. 1 has a structure which rotatably holds, via a retainer 7a, plurality of balls 5 between an inner ring 2 having an inner ring raceway 1 and an outer ring 4 having an outer ring raceway 3, and further secures seal materials 6 to the outer ring 4. The seal material 6 employs a metal-made seal material by processing such as a steel sheet in a desired shape, and beside as shown in FIG. 2, it employs a rubber-made seal material as one-body of a steel-made core 6a and an elastic member 6b.

Ordinarily, the seal material 6 is treated with corrosion resistance for avoiding corrosion by oxidation. For example, Japanese Patent Laid Open No. 62989/1999 describes, as schematically shown in FIG. 12 of the present specification, a product made by plating a Zn film 11 on a surface of a steel material 10, and on this Zn plated steel material, forming a chromate film 12 to protect the Zn film 11. In addition, another product is also known where, as schematically shown in FIG. 13 of the present specification, the steel material 10 is plated on the surface with the Zn film 11, and the chromate film 12 is formed on the Zn plated steel material to protect the Zn film 11, and further a protective film 13 of lithium silicate is provided thereon.

The above Zn plated steel material prevents the steel material 10 from corrosion by selectively ionizing a zinc being a metal which is electrochemically baser than the iron existing in the steel material 10, and this is the steel sheet of corrosion resistance being so-called self-sacrifice type. But, since the zinc is checked from elusion by the chromate film 12 formed on the Zn film 11, the corrosion resistance by the inherent self-sacrifice type is not enough displayed, and rusts are not enough checked. In case the rust appears on the raceway surface of the bearing, inconveniences such as acoustic failure or non-uniformity in torque are caused, and become fatal defects. Particularly, in the bearing sealed with the grease, the rust easily occurs on the raceway surface, and this is a big problem.

The chromate film 12 is usually formed by an electrolytic treatment of chromate (VI) solution, and the chromate (VI) elutes into a soil from wastes of the chromate treated parts, creating a serious environmental problem, and there is another problem that the forming of the chromate film 12 is not preferable from a viewpoint of an environmental protection.

Under these circumstances, the present invention has been made, and it is an object to offer such a rolling bearing excellent in the corrosion resistance and also suited to the environmental protection.

DISCLOSURE OF THE INVENTION

For accomplishing the above mentioned object, the present invention is to offer the under disclosed bearing.

(1) A rolling bearing, which rotatably holds, via a retainer, a plurality of rolling elements between an inner ring having an inner ring raceway in an outer circumference and an outer ring having an outer ring raceway in an inner circumference, and is sealed with a seal or a shield member covered with a rubber, wherein a core metal of the seal or the shield member is a steel sheet that is covered with a film of 0.2 to 50 μm thickness, the film comprising a metal or an alloy having a smaller oxidation-reduction potential than that of iron, and that is formed with a film comprising an inorganic substance of lithium and silica as an uppermost layer.

(2) A rolling bearing, which rotatably holds, via a retainer, a plurality of rolling elements between an inner ring having an inner ring raceway in an outer circumference and an outer ring having an outer ring raceway in an inner circumference, and is sealed with a seal or a shield member covered with a rubber, wherein a core metal of the seal or the shield member is a steel sheet that is covered with a film of 0.2 to 50 μm thickness, the film comprising a metal or an alloy having a smaller oxidation-reduction potential than that of iron, and that is formed with a film comprising an acrylic resin or a urethane resin as an uppermost layer.

(3) The rolling bearing as set forth in the above mentioned (1) or (2), wherein the film comprising the metal or the alloy having a smaller oxidation-reduction potential than that of iron is a thin film comprising gallium, zinc, cobalt, molybdenum, vanadium, titanium, aluminum, magnesium, or an alloy thereof, otherwise is a laminated film having a plurality of the thin films.

(4) The rolling bearing as set forth in the above (1) or (3), wherein ratio of silicon is 6 to 26 wt % in the uppermost layer determined by a ZAF correcting method.

(5) The rolling bearing as set forth in the above mentioned (4), wherein that the ratio of silicon determined by the ZAF correcting method is a value calculated from amounts of silicon, oxygen, zinc, and iron determined by use of an electron beam generating from tungsten filament supplied with voltage of 10 kV or 15 kV.

(6) The rolling bearing as set forth in any one of the above mentioned (1) to (5), wherein an overall thickness including the uppermost layer of the seal or the shield member is less than 0.41 mm.

(7) The rolling bearing as set forth in any one of the above mentioned (1) to (6), wherein the seal or the shield member has a bent portion, and a coating weight in the uppermost layer is 200 to 600 mg/m$^2$.

(8) The rolling bearing as set forth in any one of the above mentioned (1) to (6), wherein the seal or the shield member has a bent portion and a curved portion each having a radius of curvature of 0.04 mm or more, and a coating weight in the uppermost layer is 200 to 600 mg/m$^2$.

Figure 1:
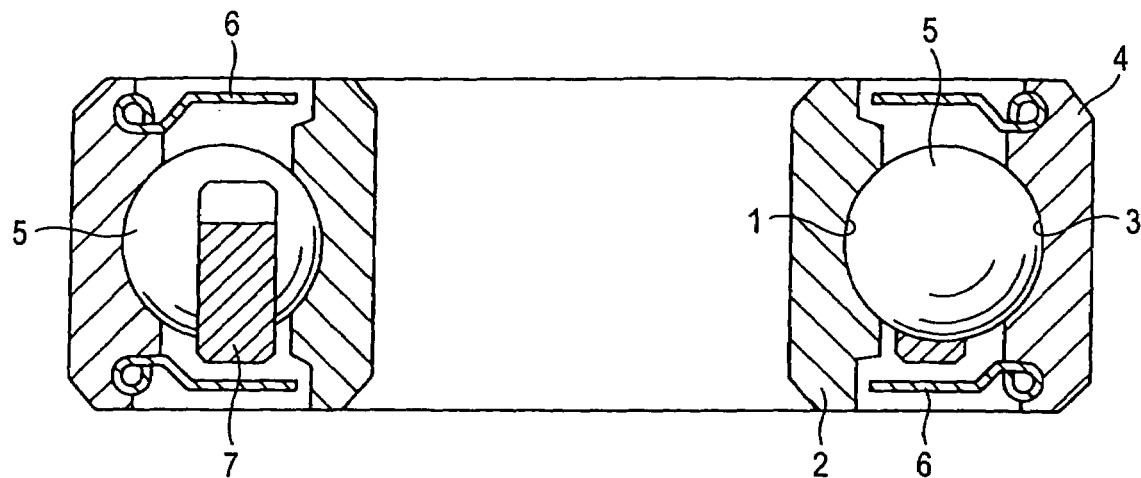
FIG. 1 is a cross sectional view showing one embodiment (having the metal-made seal material) of the rolling bearing of the present invention and the conventional art.

In the drawings, reference numeral 1 designates the inner ring raceway, 2 designates the inner ring, 3 is the outer ring raceway, 4 is the outer ring, 5 is the ball, 6 is the seal material, 7 is the retainer, 10 is the steel sheet, 11 is the Zn film, 12 is the chromate film, 13 is the protective film, 20 is the corrosion resistant film, 21 is the film of a vanadium compound, 22 is the resin-made protective film, 31a to 31c and 34a to 34b are bent portions, 32 is a plane part, and 33 is a curved part.

MOST PREFERRED EMBODIMENT OF PRACTICING THE INVENTION

In the under description, the present invention will be explained in detail with reference to the attached drawings.

In the present invention, the structure of the rolling bearing itself is limitless, for example, the ball bearing shown in FIG. 1 may be exemplified. That is, the ball bearing has a structure which rotatably holds, via the retainer 7, plurality of balls 5 between the inner ring 2 having the inner ring raceway 1 and the outer ring 4 having the outer ring raceway 3, and further secures seal materials 6 to the outer ring 4. The present invention structures the seal material 6 as mentioned under so as to impart the corrosion resistance by far excellent than the conventional corrosion resistance.

Figure 2:
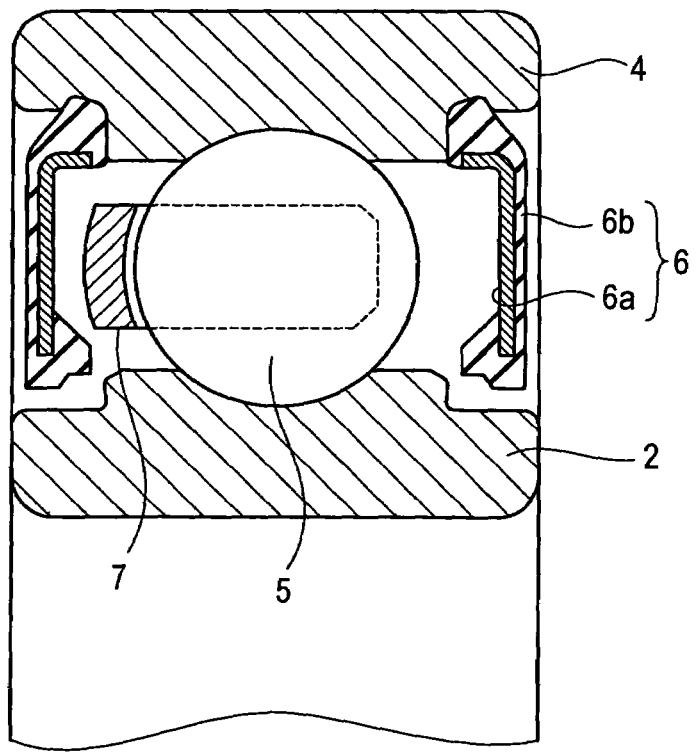
FIG. 2 is a cross sectional view showing another embodiment (having the rubber-made seal material) of the rolling bearing of the present invention and the conventional art.
Figure 3:
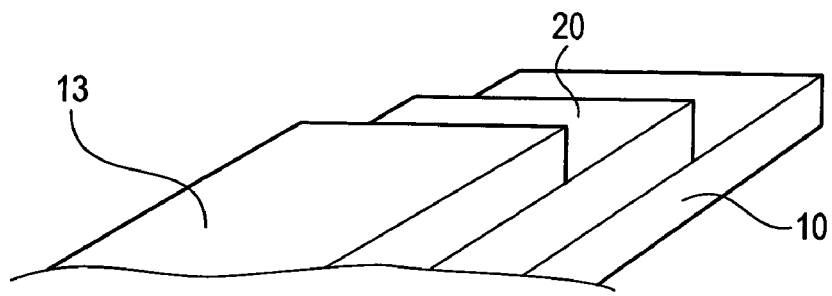
FIG. 3 is a schematic view showing a structure of the core metal comprising the metal seal material or the rubber seal material used to the rolling bearing of the present invention.

The seal material 6 employs the metal-made seal material as shown in FIG. 1, and beside as shown in FIG. 2, it may also employ the rubber-made seal material as one-body of the core 6a and an elastic member 6b such as the rubber. Only, in the present invention, as schematically shown in FIG. 3, a film 20 (called as "corrosion resistant film" hereafter), which comprises a metal or an alloy having a smaller oxidation-reduction potential than that of iron, is formed on the surface of the steel plate 10, and a protective film 13 of an inorganic substance (silicate) of lithium and silica is further formed thereon so as to use to the core metal 6b of the metal-made seal material or the rubber-made seal. The steel sheet 10 is not limited, and an ordinary cold-rolled steel sheet or the like may be served, and the thickness thereof is generally 0.1 to 0.5 mm.

It is known that the iron being a basis material of the steel sheet 10 functions as an anode to a metal having a larger ionization tendency than that of the iron (the metal being baser than the iron; e.g., Zn or Mn) under a existence of an electrolytic solution such as a steam dissolved with a small amount of salt or the like, or a salt water). For example, values of standard electrode potential e0 at 25° C. are Mn|Mn$^{++}$: −1.18, Zn|Zn$^{++}$:−0.76, and Fe|Fe$^{++}$:−0.44.

Metals having a smaller oxidation-reduction potential than that of the iron include gallium, zinc, cobalt, molybdenum, vanadium, titanium, aluminum, magnesium, or alloy thereof. Zinc, cobalt, molybdenum or alloy thereof are preferable in cost, and zinc or its alloy (for example, Zn—Co—Mo) is most preferable in view of magnification of difference in oxidation-reduction potential from that of the iron. For the corrosion resistant film 20, layers of these metals or their alloys may be plurally laminated.

The thickness of the corrosion resistant film 20 is 0.2 to 50 μm, and being less than 0.2 μm, a time durable against the sacrificial protection is insufficient, and although thickening than 50 μm, an effect by thickening is not recognized to cause uneconomical, and workability in the seal material is worsened. A preferable thickness is 0.2to20 μm, especially 0.2 to 10 μm, and most preferably 0.5 to 3 μm.

A method of forming the corrosion resistant film 20 is not limited, and an electroplating method or a method of immersing the steel sheet 10 in a molten metal are available. For a comparatively thin film, the electroplating method is desirable, while for a comparatively thicker film, the immersion method is desirable.

On the other hand, the thickness of the protective film 13 of lithium and silicate is preferably 0.01 to 5 μm, more preferably 0.05 to 0.5 μm. Being less than 0.01 μm, an effect of improving the corrosion resistance is insufficient, and exceeding 5 μm, when processing into the core metal, the protective film 13 is broken and broken particles mix into a rolling face and those are likely to cause bad influences to acoustic characteristics. A method of forming the protective film 13 is sufficient with existing methods.

By the Si content in the protective film 13, the corrosion resistance is varied. For securing the sufficient corrosion resistance, though depending on the kind and the thickness of the corrosion resistant film 20,1 for example, it is preferable that if the coating weight of a complex Zn plating is 5 g/m², the Si content in the protective film 13 is 10 to 40 wt %, and if the coating weight of the complex Zn plating is 10 g/m², the Si content in the protective film 13 is 6 to 26 wt %.

Figure 4:
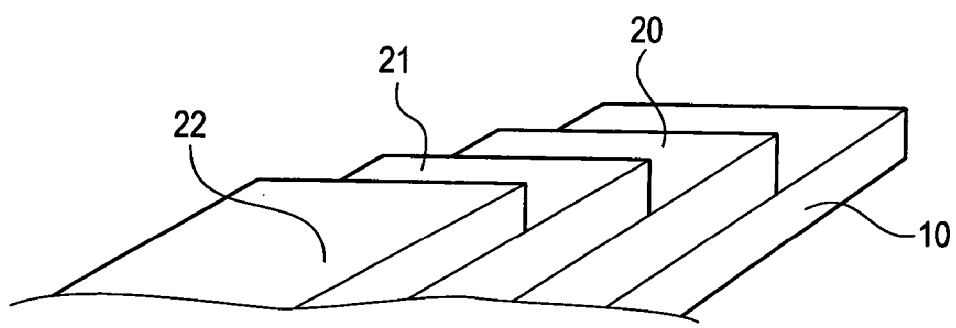
FIG. 4 is a schematic view showing another structure of the core metal comprising the metal seal material or the rubber seal material used to the rolling bearing of the present invention.
Figure 5:
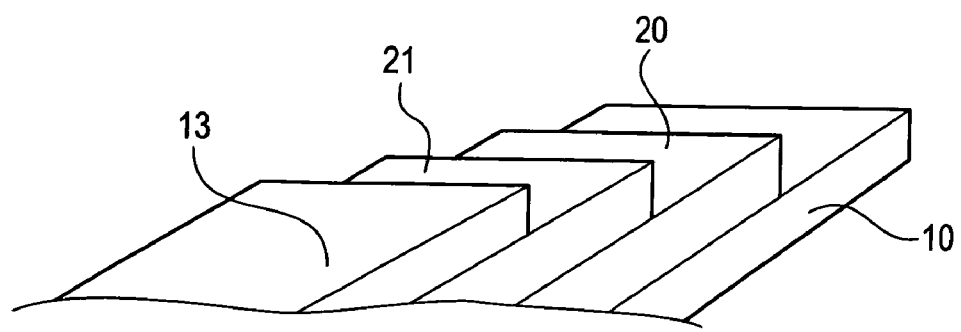
FIG. 5 is a schematic view showing a further structure of the core metal comprising a metal seal material or the rubber seal material used to the rolling bearing of the present invention.

As to the corrosion resistant film and the protective film, not limiting to the above structure, the film structures as shown in FIGS. 4 and 5 may be possible. That is, as schematically shown in FIG. 4, it is sufficient that the corrosion resistant film 20 similarly to the above is placed on the steel sheet 10, the film 21 of the vanadium compound is further interposed thereon, and the resin-made protective film 22 comprising the acrylic resin or the urethane resin is furthermore provided thereon. The thickness of this resin protective film 22 is similar to that of the film 13 of the above lithium and silicate. The thickness of the film 21 comprising the vanadium compound is not especially limited.

As schematically shown in FIG. 5, the corrosion resistant film 20 similar to the above is placed on the steel sheet 10, the film 21 of the vanadium compound is further interposed thereon, and the protective film 13 of lithium and silicate is furthermore provided thereon.

In the core metal shown in FIG. 4, the film comprising phosphate may be provided instead of the resin protective film 22. The film thickness may be similar to the resin protective film 22. A chemical conversion treating solution includes Pal bond L15C, Pal bond L18, Pal bond 20, Pal bond 37 group, Pal bond N144, Pal bond N160, Pal bond L3007, Pal bond L3027, Pal bond 3050, Pal bond 3100, Pal bond 3112 group, Pal bond 3118, Pal bond 3140, and Pal bond WL35 made by Nippon Parkarising (KK), and other chemical conversion solutions according to them may be used.

The above mentioned corrosion resistant film 20 and the protective film 13, the film 21 comprising the vanadium compound, the resin protective film or the phosphate protective film 22 are preferably formed on both surfaces of the steel sheet 10, and are useful particularly in the metal-made seal material 6 all over exposed as shown in FIG. 1. For making the seal material 6, the film may be formed on the steel sheet 10, followed by shaping as desirably through the press-forming, otherwise, the steel sheet 10 previously shaped as desirably may be formed with these films.

In the method of carrying out the pressing after forming the film, cracks possibly occur in the film at parts largely effected with a process stress. Therefore, it is preferable to perform the surface treatment on the film to be a primary layer. For example, in the shield plate shown in FIG. 3 where the Zn plated film is formed as the corrosion resistant film 20 and the film comprising lithium and silicate is formed as the protective film 13, a water-rinsing is generally performed after the electroplating to remove the plating liquid adhered to the Zn plated film, and at this time, an oxidized film containing a plating liquid is formed on electrode surface of the Zn plated film to decrease adhesion with the film comprising lithium and silicate formed thereon.

Therefore, the Zn plated film is cleansed on the surface by a physical cleaning such as plasma cleaning or ion bombard, or a chemical cleaning (etching) using acid or alkali. Because of enabling an in-line treatment in a producing process, the etching with an acid solution or an alkaline solution, otherwise the electrolytic treatment are suited. As the acid solution for this case, a solution having a hydrogen ion concentration of pH4 or less, such as nitric acid, hydrochloric acid, phosphoric acid or sulfuric acid is effective, and as the alkaline solution, ammonia or soda are effective. Among them, especially suitable is the non-volatile acid solution of phosphoric acid, sulfuric acid or the like of less changing in the acid density for a long period.

By carrying out the surface treatment on the film to be the primary layer, the adhesion with the film to be formed thereon is heightened, so that the film thickness may be made thin advantageously in cost.

Beside, in case of using to the bearing of small thickness (for example, No. 6800 series by NSK Ltd.), for reasons of deforming roundness of the outer ring by caulking the shield plate to the outer ring, it is preferable that the overall thickness including the uppermost layer of the shield plate is less than 0.41 mm.

Figure 6:
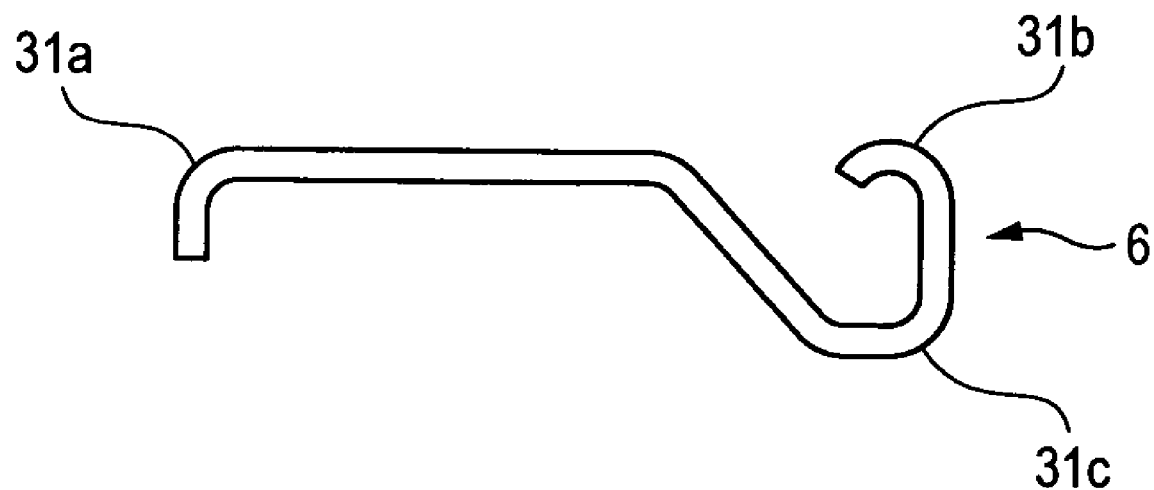
FIG. 6 is a schematic view showing a still further structure of the core metal comprising a metal seal material or the rubber seal material used to the rolling bearing of the present invention.
Figure 7:
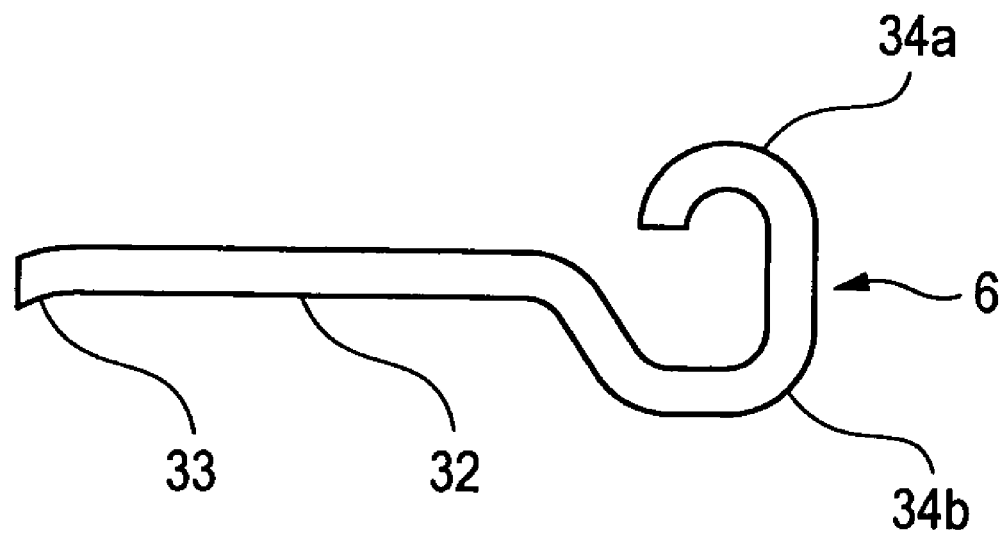
FIG. 7 a schematic view showing a yet further structure of the core metal comprising a metal seal material or the rubber seal material used to the rolling bearing of the present invention.

Further, the shield plate 6 is, as shown in FIGS. 6 and 7, often processed into shapes having a bent portion, a curved portion or a curled portion. For example, the shield plate 6 shown in FIG. 6 is formed with the bent portions 31a, 31b, 31c having a radius of curvature of 0.04 mm and more at a front end and parts to be caulked, while the shield plate 6 shown in FIG. 7 is formed with the curved portion 33 having a radius of curvature of 0.04 mm and more at a front end of plane part 32 and with a curled portion of the bent portions 34a, 34b at the caulked part. In the shield plate 6 having the bent portion, the curved portion, or the curled portion, if determining the coating weight in the uppermost layer to be 200 to 600 mg/$M^2$, the corrosion resistance in these portions can be heightened. Being less than 200 mg/$m^2$, the corrosion inhibition effect is not obtained, and the corrosion of the steel sheet progresses with increasing speed. Exceeding 600 mg/$m^2$, cracks are easy to occur in these parts while processing.

By the way, if the coating weight in the uppermost layer is shown in terms of the Si content by the ZAF method, as shown in later mentioned Examples, 200 mg/$m^2$ is 10 wt % (accelerating voltage 10 kV) and 5.8 wt % (accelerating voltage 15 kV), and 600 mg/$M^2$ is 36 wt % (accelerating voltage 10 kV) and 21 wt % (accelerating voltage 15 kV) In addition, according to an X ray photoelectron analytical method (XPS), these amounts per unit surface area correspond to 0.18 to 0.65 μm.

Figure 13:
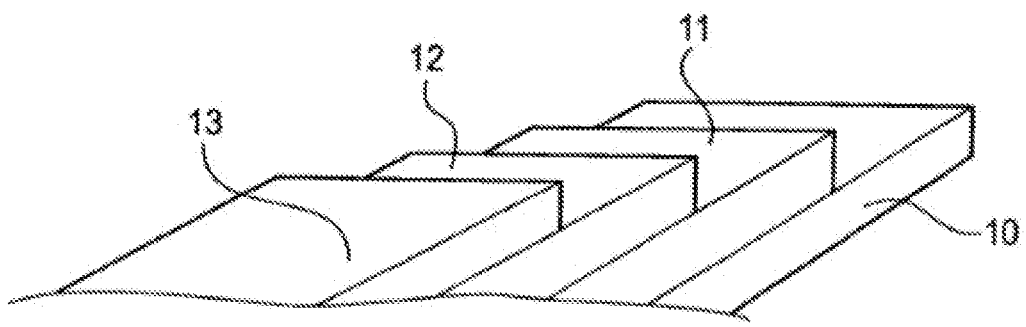

The seal material 6 structured as mentioned above is excellent in the corrosion resistance, and is useful especially to the rolling bearing sealed with the grease, and the effect of suppressing the rust occurrence in the raceway surface is largely improved in comparison with the conventional cases. Since there is not the chromate film (see reference numeral 12 of FIG. 13) as the conventional art, the circumferential pollution is not brought about by chromate (VI).

The lubricant to be sealed for lubrication is not limited, and for example, lithium soap-mineral based grease, lithium soap-ester oil based grease, urea compound-ester oil based grease, or urea compound-synthetic hydrocarbon oil based grease are appropriately selected and may be sealed. The lubrication is possible in other than the grease.

The present invention has been explained in detail and with reference to the especial embodiments, and it is apparent to those skilled to add various modifications or revisions so far as being not out of the spirit and scope of the present invention.

EXAMPLES

The present invention will be explained with reference to Examples, but the present invention is not limited to these Examples.

Example 1

A cold rolled steel sheet having 0.3 mm thickness was formed with a film of Zn alloy (Zn—Co—Mo) through the electroplating by changing the film thickness, and another film of a compound of lithium and silicate having the fixed thickness of 0.3 μm was further formed thereon. Subsequently, the steel sheet of Zn alloy film was press-formed into a shield plate for the bearing No. 6203 by NSK Ltd. and attached to the above bearing to make a test sample.

The above test sample was left for 360 hours in an acid atmosphere (40° C.) adjusted to be relative moisture 40% by use of the solution of glycerin 64% and water 36% containing a formic acid 300 ppm. A reason for using the formic acid was because considering occurrence of the formic acid and an acetic acid when insufficient drying a varnish used to the rotor of the motor support-bearing or the like. After taking out the test sample from the acid atmosphere, the raceway surface was observed to investigate rust occurring points.

Figure 8:
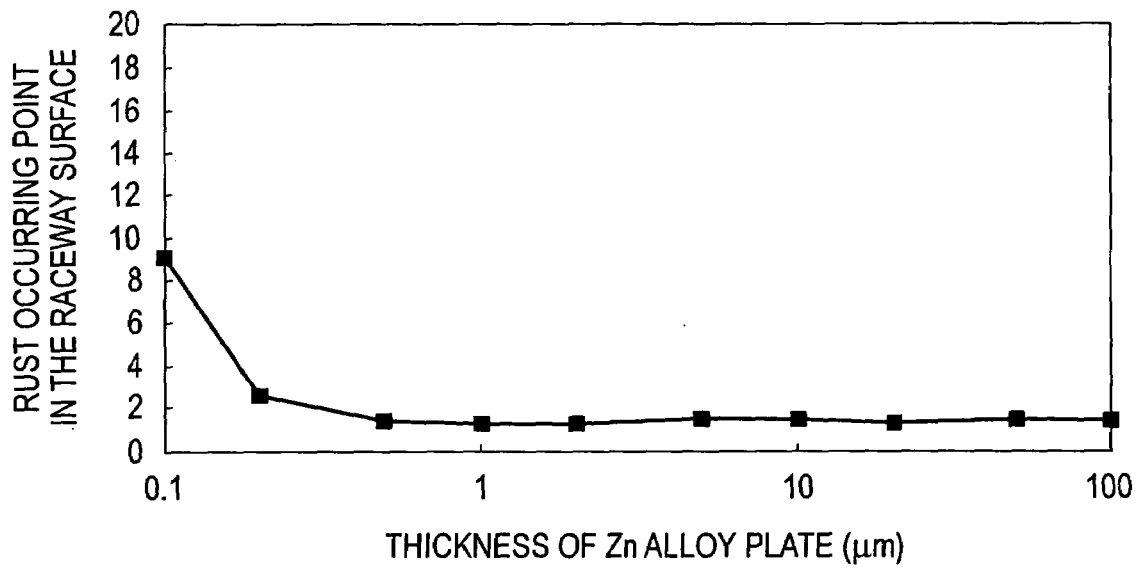
FIG. 8 is a graph showing the relation between the film thickness of the Zn alloy film and the rust occurring points obtained in the examples.

The rust occurring points by difference in the film thickness of the Zn alloy film are shown with a graph in FIG. 8, and it is seen that the rust occurrences are surely checked in the range of 0.2 μm or more thickness of the Zn alloy film.

Example 2

A cold rolled steel sheet having 0.2 mm thickness was electroplated with a film of Zn alloy (Zn—Co—Mo) in the coating weight of 10 g/$m^2$, and another film of a compound of lithium and silicate having the fixed thickness of 0.3 μm was further formed thereon. Subsequently, the steel sheet of Zn alloy film was press-formed into a shield plate for the bearing No. 608 by NSK Ltd., and attached to the above bearing to make a test sample. The coating weight was measured in that the steel sheet was based on a plate adhering amount test by the fluorescent X ray of JIS G3313. Also in the following Examples and Comparative Examples, the coating weight was measured in the same manner.

Example 3

A cold rolled steel sheet having 0.2 mm thickness was electroplated with a film of Zn alloy (Zn—Co—Mo) in the coating weight of 10 g/m$^2$, and another film of vanadium compound was further formed thereon through the electrolytic reduction, and a film of an acrylic resin having the 0.3 μm fixed thickness was furthermore formed thereon. Subsequently, the steel sheet of Zn alloy film was press-formed into a shield plate for the bearing No. 608 by NSK Ltd., and attached to the above bearing to make a test sample.

Example 4

A test sample was made in the same manner as Example 3 other than a urethane resin in substitution for the acrylic resin.

Example 5

A cold rolled steel sheet having 0.2 mm thickness was electroplated with a film of Zn alloy (Zn—Co—Mo) in the coating weight of 10 g/m$^2$, another film of vanadium compound was further formed thereon through the electrolytic reduction, and a film of a compound of lithium and silicate having the 0.3 μm fixed thickness was furthermore formed thereon. Subsequently, the steel sheet of Zn alloy film was press-formed into a shield plate for the bearing No. 608 by NSK Ltd., and attached to the above bearing to a make test sample.

Comparative Example 1

A cold rolled steel sheet having 0.2 mm thickness was electroplated with a film of Zn alloy (Zn—Co—Mo) in the coating weight of 10 g/m$^2$, a chromate layer was further formed thereon from the Cr solution through the electrolytic treatment and a film of a compound of lithium and silicate having the 0.3 μm fixed thickness was furthermore formed thereon. Subsequently, the steel sheet of Zn alloy film was press-formed into a shield plate for the bearing No. 608 by NSK Ltd., and attached to the above bearing to make a test sample.

(Corrosion Resistant Test)

The above test samples were left for 360 hours in the acid atmosphere (40° C.) adjusted to be relative moisture 40% by use of the solution of glycerin 64% and water 36% containing the formic acid 300 ppm. After taking out the test samples from the acid atmosphere, the raceway surfaces were observed to investigate rust occurring points. The results are shown in Table 1, in which less than 3 of the rust occurring points is "○", 3 to 5 is "Δ", and 6 or more is "×". It is seen from Table 1 that each of Examples 2 to 5 according to the present invention shows the excellent corrosion resistance in the ring member of the bearing. The present test of the corrosion resistance is an accelerated test, and causes of the rust occurrence are governed by the Zn plated layer in the surface of the shield plate and conditions of the bearing ring in association therewith. That is, the effect of the sacrificial protection may be expected by covering the surface of the shield plate with the metal being baser than the metal kinds forming the bearing raceway surface. It is considered that being without the chromate layer, the effect of the sacrificial protection works more effectively.

TABLE 1

| | Rust occurrences in parts of the bearings | | | | | | |
|---|---|---|---|---|---|---|---|
| | Outside diameter surface of the outer ring | Inside diameter surface of the inner ring | Raceway surface of the outer ring | Raceway surface of the inner ring | Shield plate | Use of chromium (VI) solution | All-out evaluations |
| Example 2 | ○ | ○ | ○ | ○ | ○ | Absent | ◎ |
| Example 3 | ○ | ○ | ○ | ○ | ○ | Absent | ◎ |
| Example 4 | ○ | ○ | ○ | ○ | Δ | Absent | Use: Yes |
| Example 5 | ○ | ○ | ○ | ○ | Δ | Absent | Use: Yes |
| Comparative Example 1 | X | Δ | X | Δ | ○ | Present | Use: No |

(Inspection of the Si Content in the Protective Film)

Each of cold rolled steel sheets having 0.2 mm thickness was electroplated with a film of Zn alloy (Zn—Co—Mo) in the coating weight of 10 g/m$^2$, and another film (the protective film) of a lithium-silicate compound being different in the Si content was further formed on each of the resulting sheets to make test samples. This is why since the determination of the accurate thickness of the lithium-silicate compound layer was difficult, the intensity of X ray of Si was substituted to seek for the appropriate range of the lithium-silicate layer. The Si content was measured under the following conditions by use of the secondary electron microscope (SEM) "JSM-5610" made by Nippon Electron Optics Laboratory and the energy dispersion type x ray spectroscope "Phoenix/Falcon" made EDAX Inc. in U.S. attached thereto.

Accelerating voltage . . . 10 kV

Visual filed (magnification) . . . 300 times or less

Takeoff angle . . . 30°

Tilt angle . . . 0

Integration time . . . 60 sec.

Measuring elements . . . oxygen, zinc, silicon, chromium and iron

Quantitative correction . . . ZAF method

Figure 9:
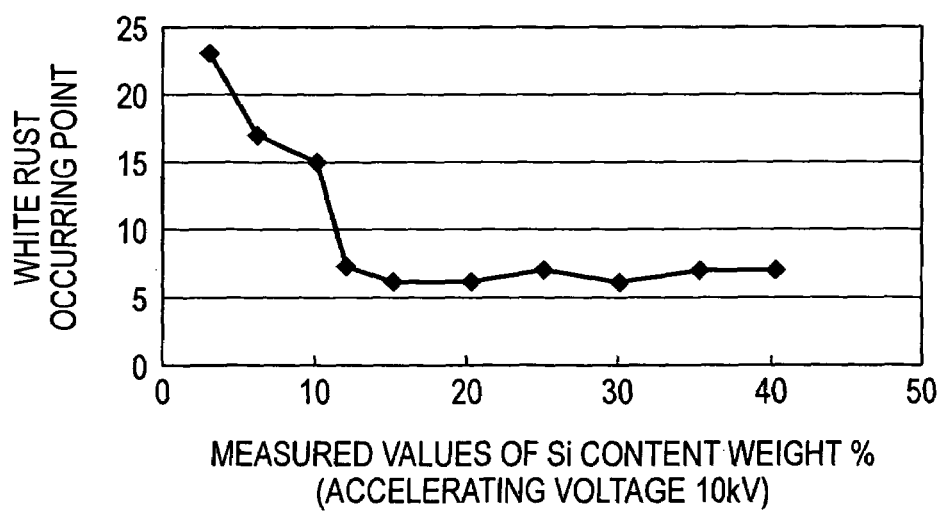
FIG. 9 is a graph showing the relation between the Si amount in the protective film at the coating weight of 10 g/m² of the Zn alloy and the white rust occurring points obtained in the examples.

Subsequently, as to each of the test samples, the 5% salt spray test was carried out in accordance with JIS Z2371, and the white rust occurring points were visually measured. The results are shown in FIG. 9, and it is seen that if the Si content in the protective film ranges 12 to 40 wt %, the good corrosion resistance is obtained.

Figure 10:
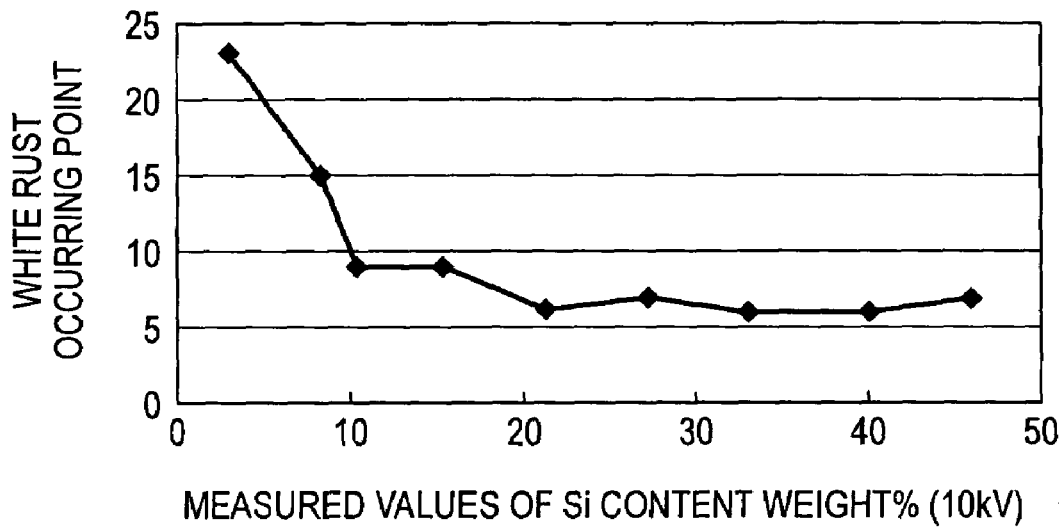
FIG. 10 is a graph showing the relation between the Si amount in the protective film at the coating weight of 5 g/m² of the Zn alloy and the white rust occurring points obtained in the examples.

Further, the similar tests were carried out by changing the coating weight of Zn alloy to 5 g/m$^2$. The results are shown in FIG. 10, and it is seen that if the Si content in the protective film ranges 10 to 45 wt %, the good corrosion resistance is obtained.

Since the X ray occurring range depends on the accelerating voltage of the electron beam, the Si measuring values of the protective layer are different depending on the thickness of the Zn plated layer. At the accelerating voltage of 10 kV as the present example, the Si content is 12 to 40 wt %, but at 15 kV, it changes from 8 to 30 wt %. In particular, under the measuring condition that the accelerating voltage of the electron beam 15 kV, if the coating weight of Zn becomes thin as 5 g/m², the X ray occurring range reaches the cold rolled steel sheet of the lower layer, and the determination of the Si content is difficult. Accordingly, the accelerating voltage of the electron beam is determined to be 10 kV.

From the above test results, it is seen that if the corrosion resistant film (the Zn alloy thin film) is formed at the thickness specified in the present invention, and preferably, the protective film (compound of lithium and silicon) is formed by adjusting Si to the optimum content in response to the thickness of the corrosion resistant film, the corrosion resistance of the steel sheet is largely improved.

(Inspection of the Surface Treatment)

As shown in Table 2, the testing steel sheets A to D (the conventional products) formed with the chromate layers on the cold rolled steel sheets of 0.2 mm and the testing steel sheets E to H (the products of the present invention) formed with the Zn alloy films (Zn—Co—Mo) on the cold rolled steel sheets of 0.2 mm and further surface-treated with the acid solution were prepared. The coating weight of the Zn alloy plated film was 10 g/m². Subsequently, the film of the compound of lithium and silicate being different in the Si content was formed by ranging from 6 to 26 wt % in the Si content. The Si content was demanded by the ZAF method (the accelerating voltage: 15 kV) in the same manner as above.

The test steel sheets were subjected to the press-forming into the shield plates for the deep groove ball bearing No. 6201 by NSK Ltd., and was observed as to cracks at the plane parts, the press-compressed parts, and the press-tension parts. Cracks were confirmed by the photograph decision of the electron microscope at the respective parts, and no crack is "◯" and crack occurrence is ×, and the results are shown in Table 2. The plane part is scarcely loaded with the pressing stress, the press-compressed part is loaded with the compression stress by deformation when processing, and the press-tension part is loaded with the tension stress by deformation when processing.

It is seen from Table 2 that the tested steel sheets according to the present invention have no crack occurrences by the press-forming.

Further, for examining the effects of the surface treatment, the tested steel sheet I and the steel sheet J were prepared. In said steel sheet I, the cold rolled steel sheet of 0.2 mm was formed with the plated film of the Zn alloy (Zn—Co—Mo), and the film of lithium and silicate was formed thereon by changing the Si contents, while in the steel sheet J, the cold rolled steel sheet of 0.2 mm was formed with the plated film of the Zn alloy (Zn—Co—Mo) and surface-treated with the sulfuric acid solution (the hydrogen ion density: $10^{-4}$), and the film of lithium and silicate was formed thereon by changing the Si contents. The coating weight of the Zn alloy plated film was each 10 g/m². Each of the test steel sheets was subjected to the press-forming into the shield sheet for the deep groove ball bearing No. 6201 by NSK Ltd., and each of the shield sheets was attached to the same bearing to make a test sample for carrying out the corrosion resistant test similarly to the above.

Figure 11:
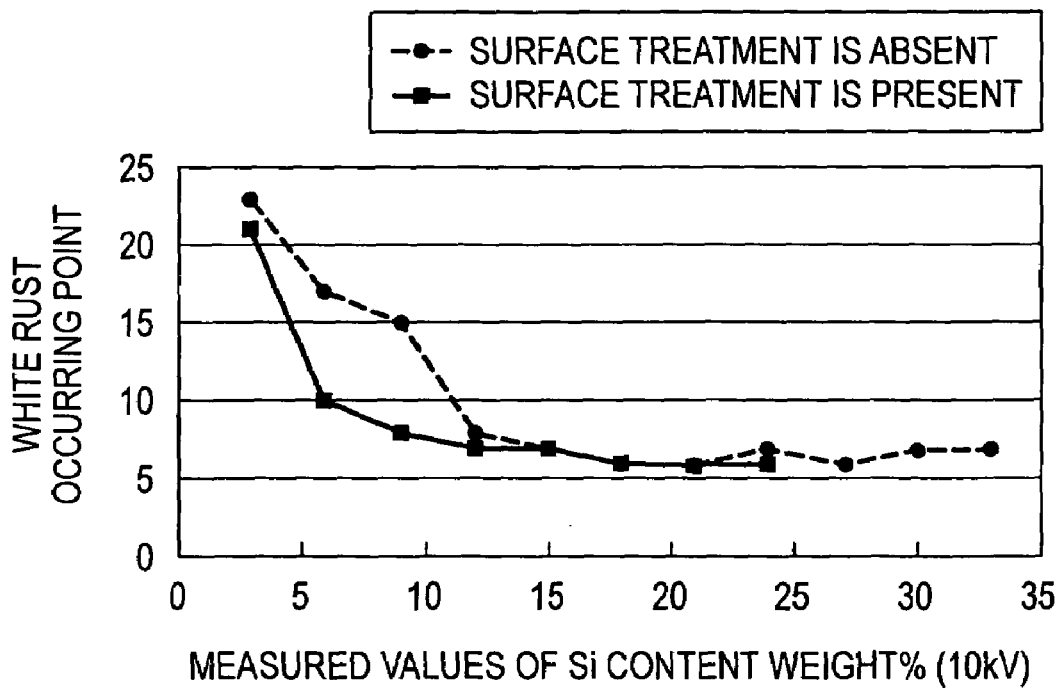
FIG. 11 is a graph showing the relation between the surface treatment of the Zn alloy plated film and the Si amount in the protective film obtained in the examples.
Figure 12:
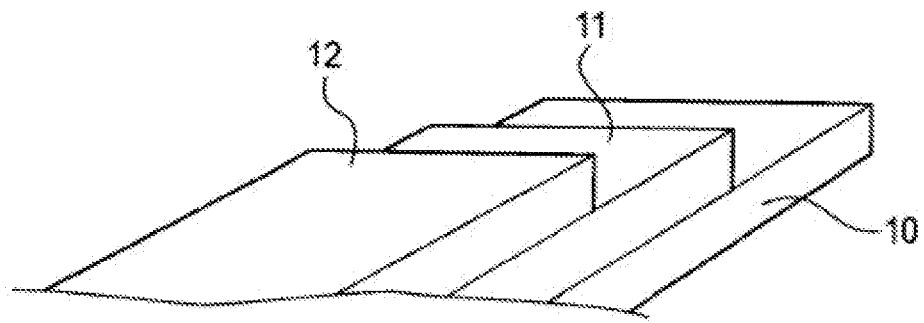
FIG. 12 and FIG. 13 are schematic views showing the structures of the core metals of the conventional metal-made seal material or the conventional rubber-made seal material.

The results are shown in FIG. 11, and it is seen that the surface treatment on the Zn plated film brought about the sufficient corrosion resistance in spite of the small Zn content. That is, without performing the surface treatment on the Zn alloy plated film, the Si content was necessary to be 12 wt % or more for obtaining the sufficient corrosion resistance, but with performing the surface treatment, the sufficient corrosion resistance was obtained even with the Si content of 6 wt %.

Further, the surface treatment such as the sulfuric acid (the surface activation treatment) on the Zn plated layer is useful for the uniform reaction also in the case of the chemical conversion treatment such as bonderizing.

Examples 6 to 15 and Comparative Examples 2 to 30

As shown in Table 3, the Zn alloy film (Zn—Co—Mo) was electroplated at the coating weight of 10 g/m², performed with the activation treatment by the sulfuric acid solution of pH3, and the film (the protective film) of the compound of lithium and silicate was further formed thereon, by changing the coating weight. The Si content was measured by the ZAF method (the accelerating voltage 10 kV and 15 kV) similarly to the above. The results are shown in Table 3.

Subsequently, this steel sheet covered with the Zn alloy was press-formed into the shield sheet having the curved part

TABLE 2

Occurrences of cracks during press-forming

| Tested steel sheets | Chromate layers | Surface treatment | Density of hydrogen ion | Si amount (weight %) | Plane parts | Press-compression parts | Press-tension parts |
|---|---|---|---|---|---|---|---|
| A | Present | Absent | — | 8 | ◯ | X | X |
| B | Present | Absent | — | 12 | ◯ | X | X |
| C | Present | Absent | — | 16 | ◯ | X | X |
| D | Present | Absent | — | 21 | ◯ | X | X |
| E | Absent | Sulfuric acid solution | $10^{-4}$ | 6 | ◯ | ◯ | ◯ |
| F | Absent | Phosphoric acid solution | $10^{-3}$ | 11.8 | ◯ | ◯ | ◯ |
| G | Absent | Hydrochloric acid solution | $10^{-2}$ | 16 | ◯ | ◯ | ◯ |
| H | Absent | Sulfuric acid solution | $10^{-1}$ | 26 | ◯ | ◯ | ◯ |

(the radius of curvature was in response to each of the bearing numbers), the plane part and the curled part as shown in FIG. 7. Crack occurrences were confirmed at the curved part, the plane part and the curled part when press-forming. The results are shown in Table 3, and in the photographic decision by the electron microscopic observation, no change in the surface property after press forming is ◎, the slight crack occurrence is ○, and the crack development is Δ.

The same steel sheets covered with the Zn alloy were left for 500 hours under the condition of dew formation, and the precipitation of zinc oxide was observed. The results are shown in Table 3. No precipitation of zinc oxide is ○, and recognized precipitation is Δ.

TABLE 3

|  | Bearing type No. | Coating weight (mg/m²) | ZAF (10 kV) | ZAF (15 kV) | Curved parts | Plane parts | Curled parts | Activation treatment | Corrosion resistance |
|---|---|---|---|---|---|---|---|---|---|
| Comparative Example 2 | 696 | 150 | 7.9 | 4.3 | ○ | ◎ | ○ | Absent | Δ |
| Comparative Example 3 | 696 | 200 | 10.4 | 5.8 | ○ | ◎ | ○ | Absent | ○ |
| Comparative Example 4 | 696 | 600 | 36.3 | 21.9 | Δ | ◎ | Δ | Absent | ○ |
| Comparative Example 5 | 696 | 650 | 38.8 | 23.4 | Δ | ◎ | Δ | Absent | ○ |
| Comparative Example 6 | 696 | 150 | 7.9 | 4.3 | ○ | ◎ | ○ | Present | Δ |
| Example 6 | 696 | 200 | 10.4 | 5.8 | ○ | ◎ | ○ | Present | ○ |
| Example 7 | 696 | 600 | 36.3 | 21.9 | ○ | ◎ | ○ | Present | ○ |
| Comparative Example 7 | 696 | 650 | 38.8 | 23.4 | ○ | ◎ | ○ | Present | ○ |
| Comparative Example 8 | 608 | 150 | 7.9 | 4.3 | ○ | ◎ | ○ | Absent | Δ |
| Comparative Example 9 | 608 | 200 | 10.4 | 5.8 | ○ | ◎ | ○ | Absent | ○ |
| Comparative Example 10 | 608 | 600 | 36.3 | 21.9 | Δ | ◎ | Δ | Absent | ○ |
| Comparative Example 11 | 608 | 650 | 38.8 | 23.4 | Δ | ◎ | Δ | Absent | ○ |
| Comparative Example 12 | 608 | 150 | 7.9 | 4.3 | ○ | ◎ | ○ | Present | Δ |
| Example 8 | 608 | 200 | 10.4 | 5.8 | ○ | ◎ | ○ | Present | ○ |
| Example 9 | 608 | 600 | 36.3 | 21.9 | ○ | ◎ | ○ | Present | ○ |
| Comparative Example 13 | 608 | 650 | 38.8 | 23.4 | Δ | ◎ | Δ | Present | ○ |
| Comparative Example 14 | 6201 | 150 | 7.9 | 4.3 | ○ | ◎ | ○ | Absent | Δ |
| Comparative Example 15 | 6201 | 200 | 10.4 | 5.8 | ○ | ◎ | ○ | Absent | ○ |
| Comparative Example 10 | 6201 | 600 | 36.3 | 21.9 | Δ | ◎ | Δ | Absent | ○ |
| Comparative Example 16 | 6201 | 650 | 38.8 | 23.4 | Δ | ◎ | Δ | Absent | ○ |
| Comparative Example 17 | 6201 | 150 | 7.9 | 4.3 | ○ | ◎ | ○ | Present | Δ |
| Example 10 | 6201 | 200 | 10.4 | 5.8 | ○ | ◎ | ○ | Present | ○ |
| Example 11 | 6201 | 600 | 36.3 | 21.9 | ○ | ◎ | ○ | Present | ○ |
| Comparative Example 18 | 6201 | 650 | 38.8 | 23.4 | Δ | ◎ | Δ | Present | ○ |
| Comparative Example 18 | 6206 | 150 | 7.9 | 4.3 | Δ | ◎ | Δ | Absent | Δ |
| Comparative Example 20 | 6206 | 200 | 10.4 | 5.8 | Δ | ◎ | Δ | Absent | ○ |
| Comparative Example 21 | 6206 | 600 | 36.3 | 21.9 | Δ | ◎ | Δ | Absent | ○ |
| Comparative Example 22 | 6206 | 650 | 38.8 | 23.4 | Δ | ◎ | Δ | Absent | ○ |
| Comparative Example 23 | 6206 | 150 | 7.9 | 4.3 | ○ | ◎ | ○ | Present | Δ |
| Example 12 | 6206 | 200 | 10.4 | 5.8 | ○ | ◎ | ○ | Present | ○ |
| Example 13 | 6206 | 600 | 36.3 | 21.9 | ○ | ◎ | ○ | Present | ○ |
| Comparative Example 24 | 6206 | 650 | 38.8 | 23.4 | Δ | ◎ | Δ | Present | ○ |
| Comparative Example 25 | 6213 | 150 | 7.9 | 4.3 | Δ | ◎ | Δ | Absent | Δ |
| Comparative Example 26 | 6213 | 200 | 10.4 | 5.8 | Δ | ◎ | Δ | Absent | ○ |
| Comparative Example 27 | 6213 | 600 | 36.3 | 21.9 | Δ | ◎ | Δ | Absent | ○ |
| Comparative Example 28 | 6213 | 650 | 38.8 | 23.4 | Δ | ◎ | Δ | Absent | ○ |
| Comparative Example 29 | 6213 | 150 | 7.9 | 4.3 | ○ | ◎ | ○ | Present | Δ |
| Example 14 | 6213 | 200 | 10.4 | 5.8 | ○ | ◎ | ○ | Present | ○ |
| Example 15 | 6213 | 600 | 36.3 | 21.9 | ○ | ◎ | ○ | Present | ○ |
| Comparative Example 30 | 6213 | 650 | 38.8 | 23.4 | Δ | ◎ | Δ | Present | ○ |

From Table 3, it is seen that the coating weight of the protective film is appropriate at 200 to 600 mg/m² in view of the corrosion resistance.

INDUSTRIAL APPLICABILITY

As having explained, according to the present invention, the rolling bearing excellent in the corrosion resistance and suited to the environmental protection.

The invention claimed is:

1. A rolling bearing, which rotatably holds, via a retainer, a plurality of rolling elements between an inner ring having an inner ring raceway in an outer circumference and an outer ring having an outer ring raceway in an inner circumference, and is sealed with a seal or a shield member, wherein a core metal of the seal or the shield member is a steel sheet that is covered with a film of 0.2 to 50 μm thickness, the film comprising a Zn—Co—Mo alloy having a smaller oxidation-reduction potential than that of iron, and that is formed with a film comprising an inorganic substance of lithium and silica as an uppermost layer, the seal or the shield member has a bent portion and a curved portion each having a radius of curvature of 0.04 mm or more, and a coating weight of the uppermost layer is 200 to 600 mg/m², wherein the core metal covered with the Zn—Co—Mo alloy film is surface treated with a solution having a hydrogen ion concentration of pH 4 or less before forming the uppermost layer comprising the inorganic substance of lithium and silica, and wherein the bent portion and the curved portion are formed in the seal or shield member after the uppermost layer is formed.

* * * * *

UNITED STATES PATENT AND TRADEMARK OFFICE
CERTIFICATE OF CORRECTION

PATENT NO. : 7,547,146 B2  
APPLICATION NO. : 10/505771  
DATED : June 16, 2009  
INVENTOR(S) : Dai Kinno et al.

Page 1 of 1

It is certified that error appears in the above-identified patent and that said Letters Patent is hereby corrected as shown below:

Title Page Under (30) Foreign Application Priority Data: delete "Feb. 27, 2002 (JP) ... 2002-051575" and insert --Feb. 27, 2002 (JP) ... 2002-051475--.

Signed and Sealed this

Twenty-fifth Day of August, 2009

David J. Kappos  
*Director of the United States Patent and Trademark Office*